United States Patent [19]

Meier

[11] Patent Number: 4,497,386
[45] Date of Patent: Feb. 5, 1985

[54] WEIGHING APPARATUS INCLUDING IMPROVED FORCE-TRANSMITTING LEVER MEANS

[75] Inventor: Eugen Meier, Meilen, Switzerland

[73] Assignee: Mettler Instrumente AG, Greifensee, Switzerland

[21] Appl. No.: 453,103

[22] Filed: Dec. 27, 1982

[30] Foreign Application Priority Data

Jul. 16, 1982 [CH] Switzerland ............... 4337/82

[51] Int. Cl.³ .................. G01G 3/08; G01G 23/02
[52] U.S. Cl. .................................. 177/229; 177/154; 177/188; 177/210 FP
[58] Field of Search ............... 177/154, 156, 184, 229, 177/255, 157, 158, 188

[56] References Cited

U.S. PATENT DOCUMENTS

| | | | |
|---|---|---|---|
| 3,027,955 | 4/1962 | McCown | 177/184 |
| 3,897,681 | 8/1975 | Meier | 73/141 R |
| 4,022,288 | 5/1977 | Canevari | 177/229 |
| 4,300,648 | 11/1981 | Gallo et al. | 177/229 |
| 4,317,495 | 3/1982 | Kuhnle et al. | 177/157 |
| 4,433,742 | 2/1984 | Lee | 177/229 |

FOREIGN PATENT DOCUMENTS 0071652 1/1981 European Pat. Off. ............ 177/229
2058369 4/1981 United Kingdom .

Primary Examiner—E. A. Goldberg
Assistant Examiner—Fred L. Kampe
Attorney, Agent, or Firm—Laubscher, Philpitt & Laubscher

[57] ABSTRACT

Weighing apparatus of the short-stroke type is disclosed including a resilient parallel guidance arrangement (3) connecting a load-receiving member (2) for vertical movement relative to a console member (1), characterized by the provision of a pivotally movable lever (14) connected between the console and load-receiving members and including a resilient arm (18) for transmitting to the measuring device—for example, a vibratory string (23)—a force corresponding with the load applied to the load-receiving member. A stop device (20) is provided for limiting the extent of pivotal movement of the lever, the force introduced into the parallel guidance arrangement being only a fraction of the load to be measured, whereby the deleterious influences disturbing the measurement force are eliminated, whereby a relatively simple and inexpensive parallel guidance arrangement of less expensive materials may be achieved.

8 Claims, 2 Drawing Figures

WEIGHING APPARATUS INCLUDING IMPROVED FORCE-TRANSMITTING LEVER MEANS

BRIEF DESCRIPTION OF THE PRIOR ART

Weighing apparatus of the short-stroke vibratory string type are well known in the prior art, as evidenced, for example, by the U.S. patents to Meier U.S. Pat. Nos. 3,779,072, 3,788,134, 3,897,681 and 3,963,082, among others. Furthermore, as shown by Swiss Pat. No. 552,799 and the European patent application No. 0 016,238, commercial and industrial scales of this short-stroke type include a console member, and a movable load-receiver member connected for vertical movement relative to the console by resilient parallel guidance means, a resilient force transmitting means being provided for transmitting the force to be measured to the weight measuring system.

The resilient guide arms of the parallel guidance system, on the one hand, and the resilient force transmission means, on the other, together form two parallel interconnected spring systems over which the weighing load is distributed according to the specifications of the spring constants selected for the individual spring systems. The share of the weighing load which is transmitted to the measuring system results from the relation:

$$P = Q \frac{1}{1 + c_p/c_k} \quad (1)$$

where P is the measurement force acting upon the measurement system; Q is the weighing load acting on the load receiver; $c_p$ is the spring constant of the parallel guide means; and $c_k$ is the spring constant of the force transmission means.

In the previously mentioned known weighing cells, these spring systems are so dimensioned that the resilient parallel guide means receives the main portion of the weighing load while the remaining part, forming the measurement force, is received by the elastic force transmission means for transmittal to the measurement system. The ratio $c_p/c_k$ is much greater than 1 (for example, it is on the order of 100). In this way, a lever-free load reduction is always achieved.

A major drawback of this concept, however, resides in the fact that the measurement force to a considerable degree depends on the spring properties, and uneven changes in these properties in both spring systems, especially with reference to temperature and the creep effects, normally result in false measurement results. Such deviations, of course, can be compensated for, but this can be done only partially with relatively major effort. In order, for example, to avoid or reduce the effects of creepage to a permissable degree, it is necessary to take measures which assure that the same material stretch conditions will prevail in both spring systems under load. For this purpose, for example, it has been proposed in a prior art proposal to form the guide means and the force transmission means—both of which consist of leaf springs with locally concentrated bending points—of the same material, the components being so dimensioned that the bending stress change caused by a load change will be the same at all bending points. The manufacture of such spring systems, however, requires high precision machining, and the way the elastic parts are clamped in place likewise is connected with strict and severe requirements.

Similarly, if a weighing cell is used which contains only a parallel spring system for force transmission, only load reductions can be performed, i.e., load transmission would have to be effected by additional means provided outside the weighng cell.

Another problem in such weighing cells is the provision of safety means protecting the measurement cell against overload or shock. The resilient design of the force transmission member constitutes an initial protective measure. In addition, however, it is also necessary to provide a mechanical stop for the movable part of the weighing cell. Here it is particularly advantageous if this stop were to be located as near as possible to the end of the force transmission path so that shock waves, conducted into the load receiver, will also be isolated from the measurement system. The difficulty now is reliably to adjust a stop for the maximum value of the measurement force in the sometimes very short distances covered by the load receiver. Under the most unfavorable circumstances, especially in case of still resilient parallel guidance means, the distance covered by the load receiver is so small relative to the controllable path of the measurement system that a stop adjustment is practically impossible.

The present invention is intended to make it possible to construct a weighing cell of the type described above, where the measurement force conducted into the measurement system is substantially independent of the design of the parallel guidance means and the material properties of the pertinent guide means, and further having more favorable prerequisites for providing a mechanical stop to protect the short-path measuring system and which has a broader field of application.

SUMMARY OF THE INVENTION

Accordingly, a primary object of the present invention is to provide a force-transmitting lever for transmitting the load-responsive movement of the load receiving member to the weight measuring means on the console, which lever has an arm portion that cooperates with stop means on the console for limiting the extent of travel of the force-transmitting lever.

In a preferred embodiment of the invention, the force transmission member comprises a resilient bending spring which forms a lever arm that is effective in force transposition. The load receiver engages on the rigid lever arm while the resilient lever arm acts upon the measurement system.

The measurement force P now results from the following relationship:

$$P = \frac{a}{b} Q \frac{1}{1 + c_p/c'_k} \quad (2)$$

where $c'_k = c_k(b/a)$; a is the effective length of the rigid lever arm; and b is the effective length of the elastic lever arm.

Because a lever is used for force transportation, the force conducted into the parallel guidance can be reduced to a fraction of the weighing load ($c_p \ll c'_k$). This reduces the term $A = c_p/c'_k$ in equation (2) and thus also the influence of the changeable spring properties upon the measuring force P. In case of a load reduction ($a \ll b$), this effect is further increased so that the term A becomes negligibly small and so that the following approximation formula will apply for the measurement force:

$$P \approx (a/b)Q(1-A) \quad (3)$$

In less extreme cases, it will suffice to use simple, known measures for the compensation of the disturbing effects arising from the spring system. Under these circumstances, simple inexpensive designs for the parallel guidance can be used.

For the stop function, the lever can include an additional rigid lever arm whose effective length is so selected as to produce a sufficiently long path for cooperation with the stop. This solution is to be preferred also if, as in the case of load transposition, there is enough distance on the load receiver side of the lever for the stopping function because in this way the stop can be arranged for all utilization possibilities of the weighing cell at the same point which is best for its protective effects.

The solution according to the present invention makes it possible to construct a weighing cell which is insensitive to outside influences, and which provides accurate and stable illustration of the measuring force over the entire measurement range. It is suitable for use both in commercial and industrial scales and also, for example, in analytical scales. In a broad area of application, the only variable to be adjusted to the particular nominal load is the effective length of the lever arm engaged by the load receiver.

BRIEF DESCRIPTION OF THE DRAWING

Other objects and advantages of the invention will become apparent from a study of the following specification, when viewed in the light of the accompanying drawing, in which.

DETAILED DESCRIPTION

Figure 1:
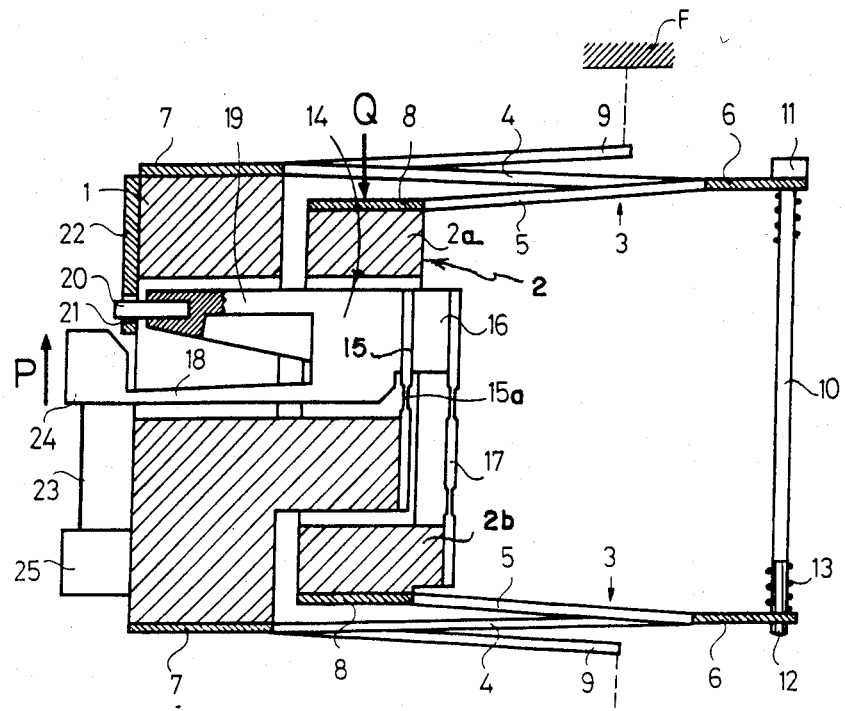
FIG. 1 is a longitudinal elevational sectional view of the weighing apparatus of the present invention taken along line 1—1 of FIG. 2.
Figure 2:
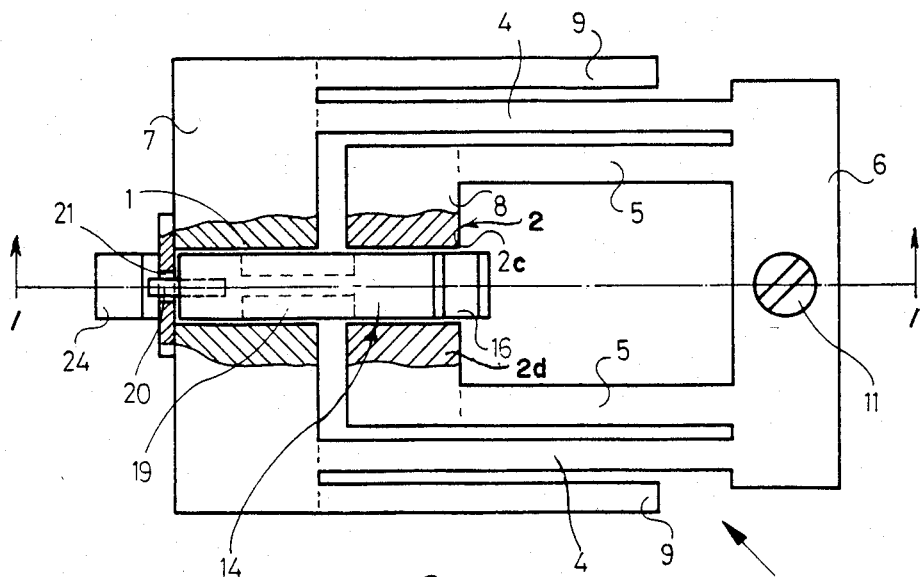
FIG. 2 is a top plan view of the weighing apparatus.

Referring now to the drawing, the weighing apparatus includes a load-receiving member 2 containing a through bore defining upper and lower horizontal portions 2a and 2b, respectively, and a pair of vertical portions 2c and 2d. The load-receiving member is connected for vertical movement relative to a console member 1 by resilient guide means including a pair of upper and lower leaf springs 3. Each leaf spring includes two pairs of parallel spaced resilient arms 4, 5 connected by a first connecting portion 6, the free ends of the arms 4 being connected by a second connecting portion 7 that is connected with the console 1, and the free ends of the arms 5 being connected by a third connecting portion 8 that is connected with the load-receiving member 2.

The arm and connecting portions of the resilient guide means 3 are integrally formed—for example, by punching or stamping—from a resilient metal sheet. If desired, each guide means may be provided with a further pair of resilient arms 9 which serve as mechanical low-pass filters for connecting the console member with a stationary frame F.

In order to maintain a parallel relationship between the upper and lower guide means 3, an adjusting bolt 10 having a headed upper end 11 extends downwardly through an aperture in the upper guide means and includes a threaded lower end 12 that is threadably connected with the lower guide means, a helical spring 13 being mounted concentrically on the bolt for biasing apart the upper and lower guide means. Thus, during regulating of the weighing apparatus with an eccentrically arranged load on the weighing pan (not shown), the parallel orientation of the guide means may be adjusted at a readily accessible location.

In accordance with the present invention, a three-armed lever 14 is provided for transmitting the weighing force applied to the load-receiving member 2 to movement measuring means 23 connected with the console 1. Thus, the lever 14 is pivotally connected intermediate its ends with the console member 1 by a bendable resilient vertical support bearing 15 having a pivot axis 15a. On one side of the pivot axis, the lever includes a relatively short arm 16 connected with the moveable load receiver 2 by a bendable resilient vertical support bearing 17, and on the other side of the pivot axis, the lever includes a pair of horizontal vertically-spaced arms 18 and 19. In order to limit the extent of pivotal displacement of the lever 14, the upper lever arm 19 is provided with a stop pin 20 that extends through a corresponding oversized aperture 21 contained in stop plate 22 mounted on the console 1. The lower lever arm 18 is resilient and terminates at its free end in an enlarged head portion 24 to which is connected the upper end of a vibratory string element 23 of a conventional force measuring system (not shown). The lower end of the string is connected with mounting lug 25 that projects horizontally from console 1.

OPERATION

In operation, when the load-receiving member 2 is subjected to the load Q, the lever 14 is pivoted in the clockwise direction about the pivot axis 15a of bearing 15, and the resilient lever arm 18 produces the measurement force P on string 23 in accordance with the length ratio of the lever arms 16 and 18. Consequently, the resilient lever arm 18 bends because of the short stretch of the stressed string 23, while the rigid stopping lever 19 swings out fully, according to the path transposition achieved through the length ratio of lever arms 16 and 19.

String 23 is normally prestressed. The required prestressing force can be produced either through a traction-coil spring engaging at the head 24 of the resilient lever arm 18 or through a bending spring inserted between the resilient lever arm 18 and the console 1.

The stopping arrangement is at the last member of the force transmission assembly leading to the measurement system. Together with the resilient force transmission member 18, the measurement system is thus secured in an optimum fashion against overload and shock effect.

Lever 14 with its lever arms 16, 18, 19 is preferably made in one piece in which case the bending bearing includes two shanks which are attached on lateral shoulders on lever 14. An economically particularly favorable solution consists in making the lever as a die-cast metal part consisting of an aluminum alloy.

On the other hand, it is also possible to make the lever arm 18 from some other material, other than that of the remaining lever part, or the resilient force transmission member can be provided in another form, for example, in the form of a coil spring, as a separate part. In general, however, it is desirable, for the reasons mentioned earlier, to use the same material for the resilient force transmission member as for the guides of the parallel guide means, particularly with reference to the temperature dependency of the mechanical material properties.

For most practical applications, however, the parallel guidance means and the lever with the resilient force transmitting member could be made of relatively inexpensive material, owing to the arrangement of the invention, whereby a possibly higher temperature coefficient of the elasticity module does not have to be considered.

The weighing cell described is also suitable for use in scales with a high nominal load. For load reduction it is possible to connect a resiliently positioned bridge to the weighing cell. Here the resilient bearing together with the elastic suspension (low-pass filter) of the weighing cell again forms a parallel resilient system which weakens the effect of excessive mechanical stress upon the weighing cell and especially upon the measurement system. Through suitable selection of the material for both of these spring systems, it is possible extensively to compensate for the material-conditioned disturbance factors in the known manner.

In conclusion, it should be pointed out that the illustration of console 1 and load receiver 2, as well as guides 3, as set forth in the drawing, is intended to more clearly indicate the structure of the individual guide arms. In reality, the console 1 and the load receiver 2 have the same height and all mutually corresponding guide arms (4, 5, 9) are always parallel relative to each other.

While in accordance with the provisions of the Patent Statutes, the preferred forms and embodiments have been illustrated and described, it will be apparent that other changes and modifications may be made without deviating from the inventive concepts set forth above.

What is claimed is:

1. Weighing apparatus of the short-stroke type, comprising
   (a) a console member (1);
   (b) a load-receiving member (2);
   (c) resilient parallel guide means (3) connecting said load-receiving member with said console member for vertical displacement relative thereto;
   (d) short-travel movement measuring means (23) connected at one end with said console member;
   (e) force transmitting lever means (14) connecting the other end of said measuring means with said load-receiving member, including
      (1) a multi-arm lever (14) including a rigid first arm (19);
      (2) pivot means (15) connecting said lever with said console for pivotal movement about a horizontal pivot axis (15a), said lever including a resilient second arm (18) connected with the other end of said measuring means; and
      (3) means connecting said lever with said load receiving member, whereby vertical displacement of said load-receiving member is transmitted to said measuring means via said resilient second arm; and
   (f) stop means (20) cooperating with said rigid first arm for limiting the extent of pivotal travel of said lever about its pivot axis.

2. Apparatus as defined in claim 1, wherein said short-travel movement measuring means comprises vibratory string means.

3. Apparatus as defined in claim 1, wherein said first and second arms are integral with said lever.

4. Apparatus as defined in claim 1, wherein said resilient second arm is formed of a material having a temperature coefficient that corresponds with that of said resilient parallel guide means.

5. Apparatus as defined in claim 3, wherein said lever comprises a die-cast body formed of an aluminum alloy.

6. Apparatus as defined in claim 1, wherein said pivot means comprises bendable resilient bearing means (15).

7. Apparatus as defined in claim 1, wherein said first (19) and second (18) arms are on the same side relative to the pivot axis of said lever, said arms being parallel and spaced relative to each other.

8. Apparatus as defined in claim 7, wherein said pivot means is arranged intermediate the ends of said lever, thereby defining a third arm (16) on the opposite side of the lever pivot axis from said first and second arms, said means connecting said lever with said load-receiving member including resilient bearing means (17) connected between said third arm and said load-receiving means.

* * * * *